United States Patent [19]

Schaefer et al.

[11] Patent Number: 4,742,259

[45] Date of Patent: May 3, 1988

[54] PERMANENT MAGNET ROTOR FOR ELECTRIC MOTOR

[75] Inventors: Edward J. Schaefer; Thomas K. Antrim, both of Bluffton, Ind.

[73] Assignee: Franklin Electric Co., Inc., Bluffton, Ind.

[21] Appl. No.: 48,603

[22] Filed: May 11, 1987

[51] Int. Cl.$^4$ ................ H02K 15/14; H02K 21/14
[52] U.S. Cl. ................................ 310/156; 29/447; 29/509; 228/173.1
[58] Field of Search .............. 29/447, 509; 228/135, 228/173.1, 173.2, 184; 310/156, 42, 86, 89

[56] References Cited

U.S. PATENT DOCUMENTS

| 2,836,743 | 5/1958 | Braun . | |
|---|---|---|---|
| 3,221,194 | 11/1965 | Blackburn . | |
| 3,246,187 | 4/1966 | Iemura . | |
| 3,292,023 | 12/1966 | Kober | 310/156 |
| 3,482,131 | 12/1969 | Lytle | 310/156 |
| 3,531,670 | 9/1970 | Loudon . | |
| 3,968,390 | 7/1976 | Yasuda et al. . | |
| 4,137,884 | 2/1979 | Odazima et al. . | |
| 4,219,752 | 8/1980 | Katou . | |
| 4,227,105 | 10/1980 | Kumakura . | |
| 4,242,610 | 12/1980 | McCarty et al. . | |
| 4,311,933 | 1/1982 | Riggs et al. . | |
| 4,388,545 | 6/1983 | Honsinger et al. . | |
| 4,417,167 | 11/1983 | Ishii et al. . | |
| 4,433,261 | 2/1984 | Nashiki et al. . | |
| 4,494,028 | 1/1985 | Brown . | |
| 4,564,777 | 1/1986 | Senoo et al. | 310/156 |
| 4,625,135 | 11/1986 | Kasabian | 310/156 |
| 4,628,891 | 12/1986 | Asai et al. . | |
| 4,631,435 | 12/1986 | McCarty . | |
| 4,633,113 | 12/1986 | Patel . | |
| 4,674,178 | 6/1987 | Patel | 310/156 |

FOREIGN PATENT DOCUMENTS

| 0043981 | 6/1981 | European Pat. Off. . |
|---|---|---|
| 681348 | 12/1936 | Fed. Rep. of Germany . |
| 57-180358 | 6/1982 | Japan . |
| WO82/00117 | 12/1982 | PCT Int'l Appl. . |

Primary Examiner—Patrick R. Salce
Assistant Examiner—D. L. Rebsch
Attorney, Agent, or Firm—Marshall, O'Toole, Gerstein, Murray & Bicknell

[57] ABSTRACT

A rotor comprising a rotor shaft and a rotor core on the shaft, the core being cylindrical. A number of arcuate permanent magnets are positioned at angularly spaced positions on the outer periphery of the core, and a tubular metal sleeve is positioned around the magnets. The sleeve extends beyond the axially outer ends of the magnets and the sleeve has end portions which extend radially inwardly and overlie the ends of said magnets. The sleeve has residual tension which produces a radially inwardly directed force on the magnets, and the end portions are spun or turned over and produce a force on the ends of the magnets.

8 Claims, 1 Drawing Sheet

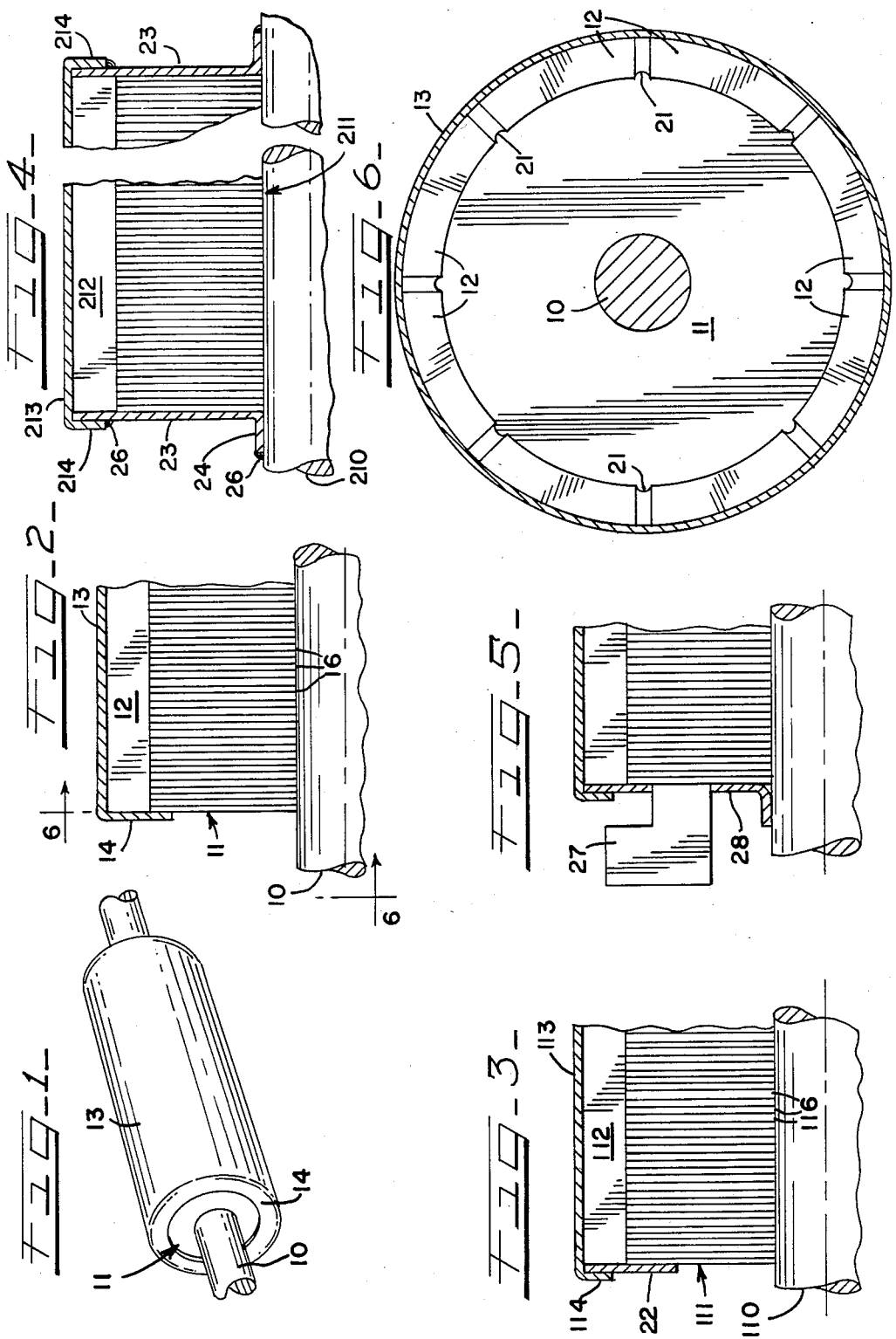

PERMANENT MAGNET ROTOR FOR ELECTRIC MOTOR

FIELD AND BACKGROUND OF THE INVENTION

This invention relates to electric motors, and more particularly to a permanent magnet rotor for an electric motor.

Numerous designs of permanent magnet rotors have been proposed in the past, particularly in recent years since advancements have been made in the quality of the magnets. In a typical rotor of this type a number of magnets are secured to the outer periphery of a cylindrical iron core. A problem that arises in the construction of this type of rotor has to do with securing the magnets to the rotor core. The securement has to be strong enough to withstand the centrifugal forces due to high speed rotation of the rotor; to withstand the angular forces due to abrupt changes in the angular velocity of the rotor; and to withstand axially directed forces that may arise if a motor is dropped, for example, during installation of the motor.

In some constructions, clamps and wedges have been provided to secure the magnets to the core, and in some instances adhesives have been used. In some other constructions a cover has been provided around the outside of the magnets. Such covers have taken the form of metal sleeves which, in some rotors, are heat shrunk over the magnets, or a binding made of a synthetic material which forms a covering.

The use of clamps and wedges is not considered satisfactory because this method is unduly expensive to manufacture and assemble. Balancing a rotor of this type may also be difficult. Adhesives are not acceptable in a motor which is filled with a liquid such as water because presently known adhesives will fail when submersed in water over a long period of time. Metal sleeves have the capability of restraining the magnets against centrifugal force, but prior art sleeves have not provided sufficient restraining force in the axial direction. Some rotors having outer sleeves have also included plates at the ends of the rotor, which may have the purpose of providing axial restraint.

It is therefore a general object of the present invention to provide an improved permanent magnet rotor for an electric motor, including a metal sleeve which holds the magnets against centrifugal, angular and axial forces.

SUMMARY OF THE INVENTION

A rotor in accordance with the present invention comprises a rotor shaft, means on said shaft forming a rotor core and said core being cylindrical, a plurality of arcuate permanent magnets positioned at angularly spaced positions on the outer periphery of said core, and a tubular metal sleeve positioned around said magnets and extending beyond the axially outer ends of said magnets, said sleeve having end portions which extend radially and overlie the outer ends of said magnets. The sleeve has a residual tension which produces a radially inwardly directed force on the magnets, and the end portions of the sleeve are spun or turned over and press against the ends of the magnets.

BRIEF DESCRIPTION OF THE DRAWINGS

This invention will be better understood from the following detailed description taken in conjunction with the accompanying figures of the drawing, wherein:

FIG. 1 is a perspective view of a rotor constructed in accordance with the present invention;

FIG. 2 is an enlarged fragmentary sectional view of the rotor;

FIG. 3 is a view similar to FIG. 2 but showing an alternative form of the rotor;

FIG. 4 is another view similar to FIGS. 2 and 3 but showing another alternative form;

FIG. 5 is a view similar to FIGS. 2-4 but showing still another alternative form; and FIG. 6 is a view taken on the line 6—6 of FIG. 2.

DETAILED DESCRIPTION OF THE DRAWINGS

With reference first to FIGS. 1 and 2, a rotor constructed in accordance with the present invention comprises a rotor shaft 10 which supports a rotor core 11. With reference to FIGS. 2 and 6, a plurality of arcuate permanent magnets 12 are mounted on the outer periphery of the core 11. On the outer surface of the magnets 12 is positioned a tubular metal sleeve which has an end portion 14 at each axially outer end of the rotor, which is turned radially inwardly and overlies the axially outer ends of the magnets 12.

The rotor shaft 10 is normally made of steel, and it is shaped to be rotatably supported by bearings (not shown) within a conventional motor stator (not shown). The core 11 in the present instance is formed by a stack of disk-shaped laminations 16 (FIG. 2) which are made of a magnetic material. The stack is secured to the outer periphery of the shaft 10, and this may be accomplished by forming a tight press-fit between the inner peripheries of the laminations 16 and the outer surface of the shaft 10. Instead of forming the core 12 from laminations as described, a solid cylinder formed of a magnetic material could instead be mounted on the shaft 10, or the shaft 10 could include an enlarged cylindrical portion in the shape of the core.

The permanent magnets 12 may be made of a conventional material and be molded to the arcuate shape illustrated in FIG. 6.

The outer sleeve 13 is preferably made of a relatively thin sheet of stainless steel in the shape of a tube. For example, 300 Type stainless steel having a thickness (for a small motor) of 0.005 to 0.010 inch may be used. Prior to assembly with the core 11 and the magnets 12, the sleeve 13 forms a straight tube and the total or overall length of the sleeve measured along its axis is longer than the axial length of the core 11 and the magnets 12. The normal untensioned inner diameter of the sleeve is slightly less than the outer diameter of the magnets on the core, and consequently when the sleeve is placed over the magnets 12, there is residual tension in the sleeve 13. The sleeve may be mounted over the magnets by various operations such as heat shrinking. Initially the end portions 14 of the sleeve extend axially beyond both ends of the rotor. The assembly is then rotated on the axis of the shaft 10 and the end portions 14 are spun or turned over to the shape illustrated in FIGS. 2-5, so that the end portions 14 extend radially and overlie at least part of the ends of the magnets 12. In a spinning operation, the end portions are folded radially inwardly, as the rotor is turned in a lathe, by a tool which is pressed against the end portions, and the operation smooths out the end portions and causes the end portions to press against the ends of the magnets. In the embodiment illustrated in FIG. 2, the end portions 14 also overlie and press against part of the ends of the core 11.

By this construction, the tensioned sleeve 13 holds the magnets 12 on the core 11 and the metal sleeve is strong enough to withstand the centrifugal forces encountered by rotation at high speeds of the rotor. In addition, the residual tension in the sleeve 13 clamps the magnets 12 tightly against the outer peripheral surface of the core 11, and this fit is normally tight enough that the frictional engagement between the magnets and the laminations of the core 11 prevent the magnets 12 from shifting angularly (in the circumferential direction) on the core 11. However, if it appears that there may be a tendency of the magnets 12 to shift angularly on the core 11, the core 11 may be formed with angularly spaced projections 21 as illustrated in FIG. 6, the projections being located between adjacent edges of the magnets 12. Thus, in the construction illustrated in FIG. 6, the projections 21 serve to angularly locate the magnets 12 at the properly spaced positions on the core 11, and the projections 21 prevent the magnets 12 from shifting in the circumferential direction during operation of the motor.

The end portions 14 of the outer sleeve 13 further function to prevent the magnets 12 from shifting in the axial direction. The magnets 12 are normally molded and there may be variations in the sizes of the magnets. Accordingly, there is a possibility that a magnet may have a slightly smaller radial thickness than other magnets of a rotor and not be tightly held by the sleeve. Without the end portions 14 of the sleeve, an undersized magnet may slip in the axial direction in the event the motor is dropped, for example, prior to or during installation. The end portions 14 of the outer sleeve 13 prevent such an occurrence because the end portions 14 overlie and press against the ends of all of the magnets and prevent a slightly loose magnet from moving axially. In the arrangement shown in FIG. 2 wherein the end portions 14 also overlap the outer peripheral portions of the core 12, the end portions 14 tightly engage and press against the ends of the magnets and the ends of the core and thereby provide added assurance against axial shifting of the magnets.

The rotor illustrated in FIG. 3 is similar to that described above except that an annular washer 22 is also provided at each end of the rotor. The rotor shown in FIG. 3 includes a rotor shaft 110 which supports a core 111, a number of magnets 112 and an outer sleeve 113. The washers 22 extend from the inner periphery of the sleeve 113 radially inwardly and partially overlap the axially outer ends of the core 111. The end portions 114 of the sleeve 113 are relatively short and are turned radially inwardly over and press against the outer edge portions of the washers 22. The washers 22 are preferably made of a thicker material than the sleeve 113, and it provides a stronger connection between the ends of the magnets 12 and the core 111. In a small motor, for example, the washers may be made of 1/32 inch stainless steel.

The construction illustrated in FIG. 4 is similar to that of FIG. 3 except that end plates 23 are substituted for the washers 22. The other parts are generally as illustrated and described in FIG. 3. Each end plate 23 extends from the inner periphery of the associated outer sleeve 213 radially inwardly to the outer periphery of the rotor shaft 210. The radially inner edge of each end plate 23 is turned to form an axially extending section 24 which is tightly secured to the outer surface of the shaft 210 by a press-fit. Thus, the end plates 23 completely cover the end surfaces of the magnets 212 and the core 211, and such an arrangement is particularly suited for use in a motor that is filled with a liquid such as water. The end plates 23 may be made of a stainless steel, similar to the washers 22. To form a liquid seal and prevent any liquid from reaching the core 211 and the magnets 212, beads of a sealing compound 26 may be provided at the inner edge of the end plates 23 and at the connection between the outer sleeve 213 and the end plates 23.

With reference to FIG. 5, the rotor illustrated therein is similar to that shown in FIG. 4 except that fan blades 27 are also provided. End plates 28 similar to the end plates 23 are provided and, prior to mounting the plates 28 on the rotor, fan blades 27 are punched and bent out from the central portions of the end plates. Such an arrangement is suitable for an air-cooled motor wherein corrosion of the core and the magnets is not a problem.

It will be apparent from the foregoing that a novel and useful permanent magnet rotor for an electric motor has been provided. The metal outer sleeve holds the permanent magnet segments in place against radially outward movement due to centrifugal force and also against axial movement. Further, the tension in the sleeve may alone be adequate to prevent angular movement of the permanent magnets, but where this is anticipated to be a problem, the projections may be preformed on the core and form abutments to prevent angular movement of the magnets.

What is claimed is:

1. A permanent magnet rotor for an electric motor, comprising an axially extending rotor shaft, a cylindrical rotor core formed on said shaft, a plurality of permanent magnets positioned at angularly spaced positions on the outer periphery of said core, and a thin tubular metal sleeve positioned around said magnets, said sleeve having residual tension and thereby pressing said magnets tightly against said core, said sleeve having a greater axial length than said core and including integral end portions which extend axially beyond the ends of said core, said integral end portions turning radially inwardly and tightly against the outer ends of said magnets.

2. A rotor according to claim 1, wherein said end portions further overlap end portions of said core.

3. A rotor according to claim 1, and further including an annular washer at each end of said rotor, said washers overlapping the ends of said magnets and portions of said core, and said end portions of said sleeve extending across the outer sides of said washers.

4. A rotor according to claim 3, wherein each of said washers engages at its outer periphery an end portion of said sleeve and at its inner periphery said rotor shaft, and said washers form a tight fit with said shaft.

5. A rotor according to claim 4, and further including sealing means between said washers and said end portions and between said washers and said shaft.

6. A rotor according to claim 3, and further including fan blades formed on said washers.

7. A rotor according to claim 6, wherein said fan blades are integrally formed on and extend axially outwardly from said core.

8. A rotor according to claim 1, wherein adjacent magnets are angularly spaced, and further including a plurality of radially outwardly extending projections on said core, said projections extending between sides of adjacent magnets.

* * * * *